United States Patent Office 3,642,903
Patented Feb. 15, 1972

3,642,903
HEXABROMOINDONE AND METHOD OF MAKING THE SAME
Richard Garth Pews, Midland, Mich., assignor to The Dow Chemical Company, Midland, Mich.
No Drawing. Filed Dec. 9, 1968, Ser. No. 782,492
Int. Cl. C07c *45/00, 49/00*
U.S. Cl. 260—586 R  2 Claims

ABSTRACT OF THE DISCLOSURE

The invention concerns hexabromoindone, a compound having the structural formula

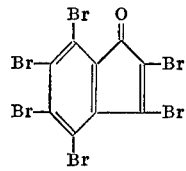

This invention concerns hexabromoindone and relates to a method of making the same.

The new compound is prepared by heating octabromo-3a,4,7,7a - tetrahydro - 4,7 - methanoindene - 1,8 - dione in an inert solvent and reaction medium such as benzene, toluene, xylene, ethylbenzene, carbon tetrachloride, methylene chloride, or perchloroethylene at elevated temperatures of from about 120° to 180° C. and at superatmospheric pressures.

The product is recovered in usual ways, e.g. by evaporating the solvent and reaction medium to dryness or to nearly dry condition then recrystallizing the product from a solvent.

The product is useful as a fire-retardant and self-extinguishing agent for styrene polymers.

The following examples illustrate ways in which the principle of the invention has been applied but are not to be construed as limiting its scope.

EXAMPLE 1

(A) A charge of 54 grams (0.1 mole) of hexabromocyclopentadiene was dissolved in 250 ml. of dimethoxyethane. The solution was cooled to −78° C. in a 3-necked round bottom glass reaction vessel equipped with a stirrer and reflux condenser. Thereafter, a solution of 11 grams (0.2 mole) of sodium methoxide in about 75 ml. of methyl alcohol was added dropwise while stirring the mixture. The mixture was allowed to warm to room temperature. At about 0° C. sodium bromide precipitated. The reacted mixture was poured onto an acidic ice-water mixture. A white precipitate was obtained. It was separated by filtering, was washed and dried. There was obtained 42.6 grams of crude product melting at 95–100° C. The product was recrystallized from a mixture of diethyl ether and methyl alcohol. The recrystallized product was 1,2,3,4 - tetrabromo - 5,5 - dimethoxy - cyclopentadiene, M.P. 104–105° C. It was analyzed and found to consist of:
Calculated (percent): C, 19.00; H, 1.37; Br, 72.39. Found (percent): C, 19.10; H, 1.36; Br, 71.75.

The calculated values are based on a compound having the formula

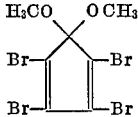

(B) A charge of 25 grams of the 1,2,3,4-tetrabromo-5,5-dimethoxycyclopentadiene prepared in part A above and 100 ml. of trifluoroacetic acid were placed in a glass reaction vessel equipped with a reflux condenser and stirrer. The mixture was stirred and heated under reflux for one hour. The mixture was cooled to room temperature and was poured onto crushed ice. A white precipitate separated. It was recovered by filtering from the aqueous liquid and was dried. The dried product was dissolved in a mixture of equal parts by volume of hexane and ethyl acetate, then was crystallized by cooling the solution. There was obtained 18 grams of octabromo-3a,4,7,7a-tetrahydro-4,7-methanoindene-1,8-dione as a white crystalline product melting at 200–202.1° C. A portion of the product was analyzed. It had the composition:
Theory (percent): C, 15.18; H, 0.0; Br, 80.78. Found (percent): C, 15.40; H, 0.30; Br, 80.50.

The molecular weight of the product was 784 as determined by mass spectroscopy. Infrared analysis shows that the product contains a bridged keto group and an unsaturated keto group. The product has the structural formula

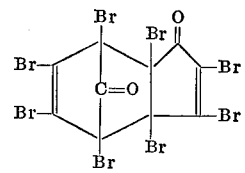

(C) A charge of 2 grams of the octa-bromo-3a,4,7,7a-tetrahydro-4,7-methanoindene-1,8-dione prepared in part B above and 15 ml. of benzene was heated in a sealed glass tube at 150° C. for 17 hours. After cooling, the tube was broken and the contents were removed. The benzene was evaporated under reduced pressure. The residue was a bright orange color. It was recrystallized from benzene. There was obtained hexabromoindone as orange crystals melting at 196–198° C. The yield of said product was 75 percent of theory. The product was analyzed. It had the composition
Theory (percent): C, 17.88; H, 0.0; Br, 79.47. Found (percent: C, 18.10; H, 0.10; Br, 79.50.

The product hexabromoindone has the structural formula

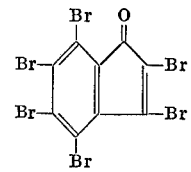

It is useful as a flame-proofing agent for styrene polymers.

EXAMPLE 2

A charge of 75 percent by weight of styrene and 25 percent by weight of acrylonitrile was mixed with 1 part by weight of the hexabromoindone prepared in Example 1, per 100 parts by weight of the monomers, and 0.3 percent by weight of lauryl peroxide. The mixture was polymerized in aqueous suspension. There was obtained 65 grams of product as polymer beads having a bright yellow color. Portions of the polymer were molded to form test bars of 1/16 x 1/16 inch cross section. In burning tests, when a bar was ignited by holding one end in a flame, then removing the flame, the burning polymer test bars were self-extinguishing in 10 seconds.

I claim:
1. A process for making hexabromoindone, which comprises heating octabromo - 3a,4,7,7a - tetrahydro - 4,7- methanoindene-1,8-dione in an inert organic solvent at a temperature of from 120 to 180° C. and at superatmospheric pressure.

2. A process as claimed in claim 1 wherein the organic solvent is benzene.

References Cited

FOREIGN PATENTS 927,149   4/1955   Germany -------- 260—586 R

OTHER REFERENCES

Eaton et al.: "Chem. Abstracts," vol. 55, pp. 5370i–5371e, 1961.

LEON ZITVER, Primary Examiner

N. P. MORGENSTERN, Assistant Examiner

U.S. Cl. X.R.

260—63 UY, 63 N, 611 F